United States Patent [19]
Hayes

[11] 4,162,092
[45] Jul. 24, 1979

[54] HOSE COUPLING
[75] Inventor: Jerry R. Hayes, Peoria, Ill.
[73] Assignee: L. R. Nelson Corporation, Peoria, Ill.
[21] Appl. No.: 839,996
[22] Filed: Oct. 6, 1977
[51] Int. Cl.² ............................................. F16L 35/00
[52] U.S. Cl. .................................. 285/39; 285/177; 285/93; 285/248; 285/423
[58] Field of Search .............. 285/247, 248, 249, 12, 285/423, 38, 39, 354, 386, 177, 388, 93

[56] References Cited
U.S. PATENT DOCUMENTS

| 862,578 | 8/1907 | Muehlberg | 285/248 |
|---|---|---|---|
| 2,000,481 | 5/1935 | Harrison | 285/248 |
| 2,354,538 | 7/1944 | Parker | 285/354 X |
| 3,640,551 | 2/1972 | Shakesby | 285/386 X |

FOREIGN PATENT DOCUMENTS

| 2209433 | 10/1973 | Fed. Rep. of Germany | 285/247 |
|---|---|---|---|
| 1168677 | 9/1958 | France | 285/249 |
| 1211656 | 10/1959 | France | 285/248 |
| 1016478 | 1/1966 | United Kingdom | 285/354 |

Primary Examiner—Dave W. Arola
Attorney, Agent, or Firm—Cushman, Darby & Cushman

[57] ABSTRACT

Apparatus for attachment to garden hoses in a wide range of sizes to provide a conventional hose fitting on an end thereof, which consists essentially of a tubular shank member molded of plastic material having exterior ring sections on one end thereof adapted to enter the interior of the hose end and a fitting on the opposite end thereof, a tubular collar member molded of plastic material having an internal threaded section on one end thereof engageable with an exterior threaded section on the shank member and an interior hose engaging flange on the opposite end thereof. A plurality of sizing members of different internal diameter sizes in the form of split rings is provided for engagement in abutting relation to the interior surface of the annular flange of the collar member.

15 Claims, 6 Drawing Figures

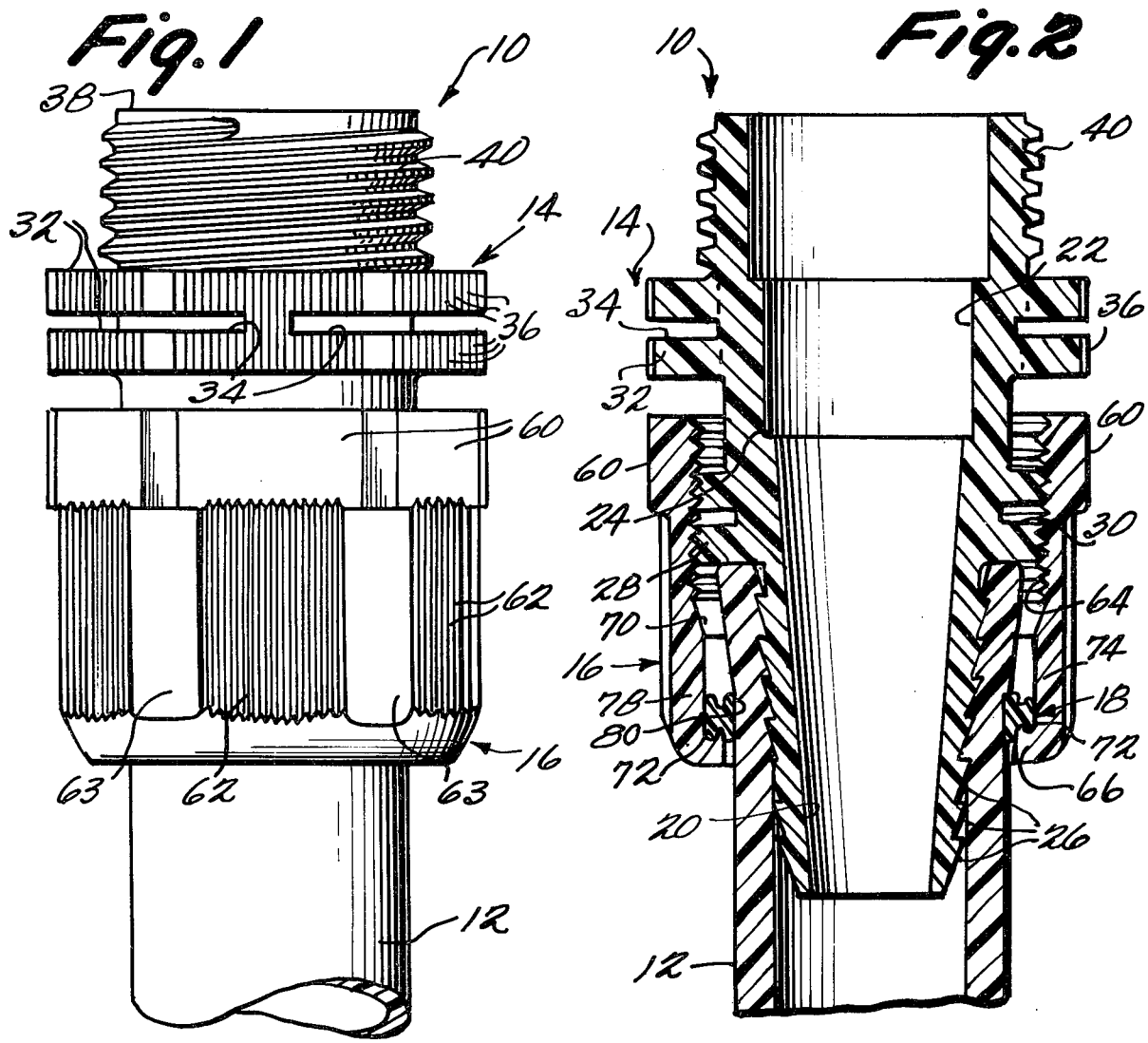
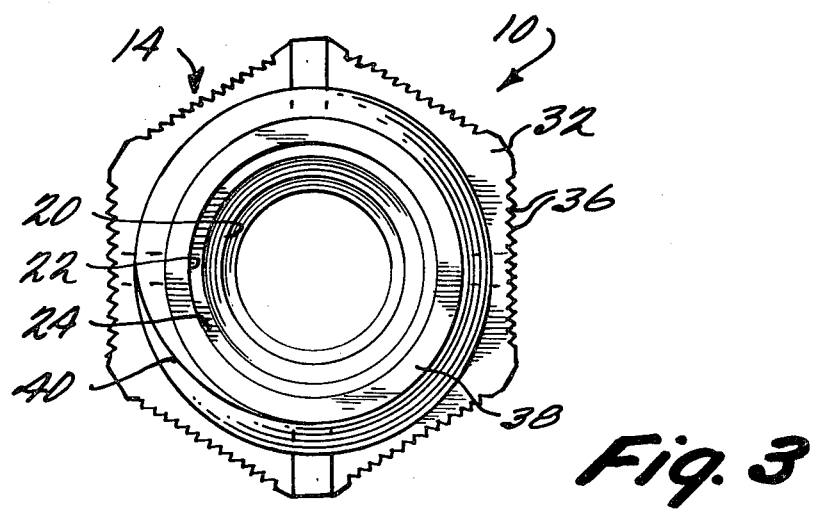

HOSE COUPLING

This invention relates to hose couplings and more particularly to improved apparatus for attachment to garden hoses in a wide range of sizes to provide a conventional hose fitting on an end thereof.

There are numerous hose coupling structures available on the commercial market for providing a conventional hose fitting on an end of the hose. In most instances, structures of this type are provided in different sizes for attachment to garden hoses of different sizes. Where it becomes necessary to provide a separate coupling structure for each hose size, cost problems are introduced, both with respect to manufacture as well as distribution.

There have been attempts over the years to provide a single coupling structure which would be applicable to garden hoses in a wide range of sizes. At the present time there is a need for a coupling structure which can effectively function in this manner. It is recognized that the patented literature is replete with structures proposed for accomplishing this function. Representative patents are as follows: U.S. Pat. Nos. 476,752; 765,109; 862,578; 2,000,481; 2,300,464; and 2,449,916.

It is an object of the present invention to provide a fitting attachment for garden hoses in a wide range of sizes which is of sufficient effectiveness, simplicity and economical cost as to meet the commercial requirements enunciated above. In accordance with the principles of the present invention this objective is obtained by providing apparatus consisting of three essential components: a tubular shank member which is molded of plastic material; a tubular collar member also molded of plastic material; and a plurality of annular sizing members, also molded of plastic material. By providing components which are molded of plastic material, simplicity, ease of manufacture and economic cost are insured. Further, the provision of a plurality of annular sizing members renders apparatus suitable for attachment to garden hoses in a wide range of sizes. Preferably the shank member has an opening extending exteriorly therethrough which is frustoconical at one end thereof, and a series of hose engaging ring sections on the exterior of the one end portion thereof which extends therefrom toward the opposite end, the diameter of each ring section extending from the one end portion exceeding the diameter of the preceding ring sections. The shank member also includes a threaded section on the exterior thereof adjacent the ring section having a diameter in excess of the diameter of the adjacent ring section, and a gripping section on the exterior thereof spaced from the threaded sections which extends radially outwardly beyond the periphery of the threaded section. Finally, a fitting is formed on the end of the shank member adjacent the gripping section, which fitting may be conveniently either a male fitting or a female fitting. The collar member is provided with an exterior gripping surface and has an interior which includes a threaded section in one end portion thereof of a size to engage the exterior threaded section on the shank member, a radially inwardly directed annular flange on the other end portion thereof having an interior diameter greater than the diameter of the largest ring section on the shank member, and an interior generally cylindrical surface of intermediate size extending between the threaded section and the annular flange. Each of the sizing members comprises a split ring having an outer section of an exterior size to fit within the collar member in surface-to-surface engagement with the interior cylindrical surface thereof and an axially inwardly facing surface of the flange thereof, and an inner section of an interior size to engage the exterior of an end portion of a hose, the interior of which is engaged over a plurality of the ring sections on the exterior of the shank member. The exterior size of the outer section of each sizing member is the same, while the interior size is different. In this way the apparatus may be utilized either without any sizing ring or selectively with one of the plurality of sizing rings, in a manner enabling the same to be fully attached to garden hoses in a wide range of sizes.

These and other objects of the present invention will become more apparent during the course of the following detailed description and appended claims.

The invention may best be understood with reference to the accompanying drawings wherein an illustrative embodiment is shown.

In the drawings:

FIG. 1 is an elevational view of apparatus embodying the principles of the present invention showing the same applied to a hose end;

FIG. 2 is a vertical sectional view of the apparatus shown in FIG. 1;

FIG. 3 is a top plan view of the apparatus shown in FIG. 1;

Figure 6:
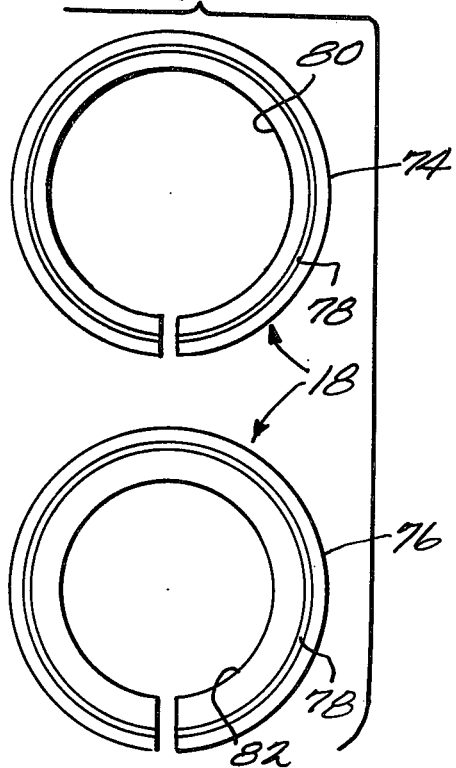
FIG. 6 is a composite view illustrating a pair of sizing ring members utilized in the apparatus of the present invention.
Figure 4:
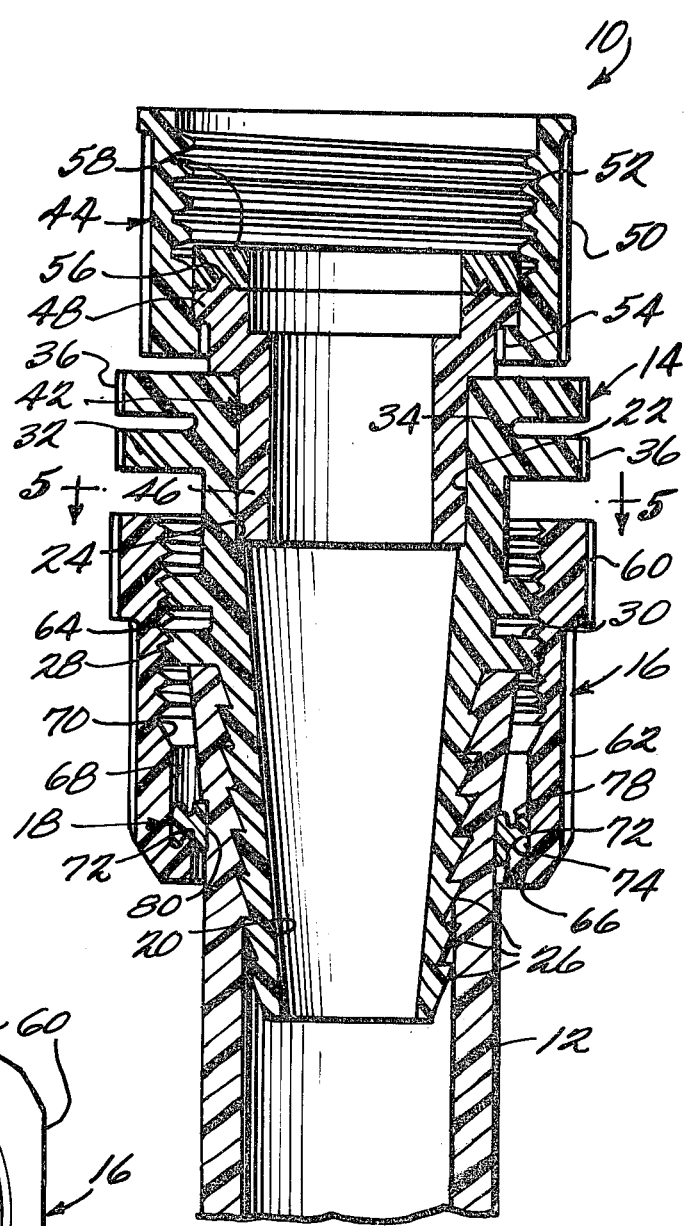
FIG. 4 is a view similar to FIG. 2 showing the apparatus embodying a female fitting as distinguished from the male fitting of the apparatus shown in FIG. 2.

Referring now more particularly to the drawings, there is shown in FIGS. 1-4 thereof apparatus in the form of a fitting assembly 10 embodying the principles of the present invention, attached to a garden hose 12, so as to provide a conventional hose fitting on an end thereof. The apparatus 10 includes three basic components: namely, a tubular shank member, generally indicated at 14; a tubular collar member, generally indicated at 16; and a plurality of annular sizing members, generally indicated at 18 (see FIG. 6). Preferably, all of the members 14, 16 and 18 are molded of plastic material. While any suitable plastic material may be utilized, a preferred embodiment for the shank and collar members is ABS (acrylonitrile-butadiene-styrene terpolymer), while a preferred embodiment for the sizing members is nylon. Preferably the plurality of sizing members is molded so that each is of a different color.

Referring now more particularly to FIGS. 1-3, the shank member 14 has an opening extending therethrough which includes a frustoconical section 20 in one end portion of the shank member and a cylindrical section 22 in the opposite end portion. As shown, the frustoconical section 20 diverges in a direction toward the cylindrical section 22 and there is provided an annular shoulder 24 between the sections which faces axially toward the other end of the shank member 14.

Formed on the exterior of the shank member 14 in the end portion thereof containing the frustoconical interior section 20 is a series of hose engaging ring sections 26. As shown, each of the ring sections is of frustoconical surface configuration diverging in a direction toward the adjacent end of the shank member 14. The maximum diameter size of each ring section 26 extending from the end is greater than the maximum diameter of the preceding ring sections. With this configuration, the entire plurality of ring sections 26 provides surface for engaging the interior of an end portion of a hose when the latter is engaged thereover.

The exterior of the shank member 14 also is provided with a threaded section 28 adjacent the ring section 26 of largest diameter, which threaded section has a diameter in excess of the diameter of the adjacent ring section. As shown, the central portion of threaded section 28 is formed with recesses 30. The purpose of the recesses 30 is to aid in the molding procedure and to save material.

The exterior of the shank member 14 also is provided with a gripping section 32 which is spaced from the threaded section 28 and extends radially outwardly beyond the periphery of the threaded section. The central portion of the gripping section 32 is likewise provided with recesses 34 which are similar to the recesses 30 and perform similar functions. The gripping section 28 is of generally hexagonal configuration in plan (see FIG. 3) so as to provide flats capable of being engaged by a suitable gripping tool such as a wrench or the like. In addition, the surfaces of the flats are roughened as by molding therein ridges 36, similar to knurling. The ridges 36 on two opposite faces are V-shaped, while the ridges on the other faces are of step shape, thus enabling the same to be provided by a two-part die in the molding procedure.

The shank member 14 also provides on the end thereof adjacent the gripping section 32 an integrally molded male fitting 38. The fitting 38 consists of an annular section having exterior threads 40 formed thereon.

Figure 5:
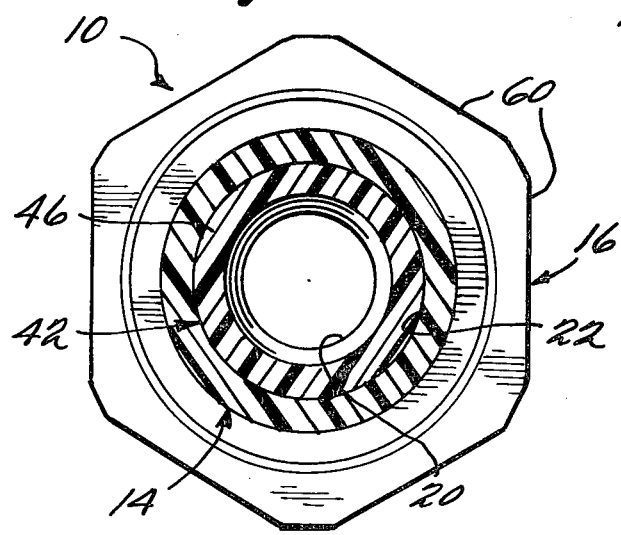
FIG. 5 is a sectional view taken along the line 5—5 of FIG. 4.

Referring now more particularly to FIG. 5, it is within the contemplation of the present invention to provide the shank member 14 with a female fitting rather than a male fitting. Such a fitting can be conveniently provided by simply blocking off that portion of the die in which the integral male fitting 38 is formed, so that the gripping section 32 constitutes the end of the integral molding of the member 14. Under these circumstances a separate tubular insert 42 swivelly carrying a separate female fitting 44 is utilized. The tubular insert 42 and female fitting 44 are also preferebly molded of plastic material, a preferred embodiment bindg ABS. It will be noted that the insert 42 includes an exterior cylindrical section 46 which is adapted to be fixedly engaged within the cylindrical interior section 22 of the shank member 14. It will be noted that the inner end of the cylindrical section 46 engages the annular shoulder 24 within the shank member 14. The opposite end of the insert member 42 includes a radially outwardly extending flange portion 48 which serves to swivelly mount the female fitting 44 to the shank member 44. As best shown in FIG. 5, the female fitting 44 is formed with an exterior ridged gripping surface 50. The interior of the female fitting includes a threaded section 52 on the outer end portion thereof and a radially inwardly directed flange portion 54 on the opposite end thereof which flange is captured between the insert flange 48 and the gripping section of the shank member 14 when the insert 42 is mounted within the shank member. The axially outwardly facing surface of the insert member 42 may be provided with an annular sealing ridge 56 which is adapted to engage a conventional sealing ring 58 or the like.

The collar member 16 is formed with an exterior gripping surface. Such gripping surface includes hexagonal flats 60 formed on one end portion of the coller for cooperative engagement with a gripping tool, such as a wrench or the like. In addition, a plurality of groups of manual gripping ridges 62, spaced apart by concave finger engaging surfaces 63, is molded in the exterior periphery of the remainder of the collar for manual gripping by the user.

The collar member 16 includes a threaded section 64 on the interior thereof adjacent the end portion where the flats 60 are provided. The interior threaded section is of a size to engage the exterior threaded section 28 on the shank member 14. Formed in the end of the collar member 16 opposite from the threaded section 64 is a radially inwardly directed annular flange 66. The flange 66 has an interior diameter dimension which is greater than the greatest maximum diameter of the largest ring 26. The collar member 60 is also formed with a generally cylindrical interior surface 68 which extends between the inner end of the threaded section 64 and the flange 66. As shown, the diameter size of the surface 68 is intermediate the interior diameter size of the threaded section 64 and the interior diameter size of the flange 66. Preferably, a frustoconical transition surface 70 is provided between the inner end of the threaded section 64 and the adjacent end of the generally cylindrical surface 68. The axially inwardly facing surface of the flange 66 is formed with hose gripping surfaces 72. As shown, the surfaces are barb or hook-shaped in cross-sectional configuration. While it is within the contemplation of the present invention to make the cross-sectional configuration continuous throughout the annular flange, as shown, there are eight annularly spaced surfaces 72 which provide for the accommodation of a collapsing interior die assembly.

As best shown in FIGS. 2 and 4–6, the plurality of sizing members 18 includes two split rings 74 and 76. Each of the split rings is of symmetrical configuration with respect to a medial radial plane. As shown, the opposite lateral faces of each ring are formed with grooves 78 shaped to receive the hose engaging surfaces 72 formed on the flange 66. The annular grooves 78 serve to divide each split ring 74 and 76 into an outer annular section which is identical with respect to both rings and an inner annular section. The inner annular section of the ring 74 has an interior cylindrical surface 80 which is of a diameter size greater than the inner cylindrical surface 82 provided on the inner annular section of the split ring 76.

The apparatus is particularly suited as a repair kit for providing a fitting on the end of a hose and has the advantage of being readily applied to the end of any one hose throughout a wide range of sizes, as, for example, ½" to ¾" in diameter. Where a male fitting is to be applied to the end of a hose, the apparatus of the present invention would be packaged to include the shank member 14 having a male fitting 38–40 thereon, a collar member 16 and two sizing members 18. For convenience in packaging, the sizing members are mounted within the collar and the collar threaded on the shank member.

In operation, the collar is unthreaded from the shank and the size of the hose to which the fitting is to be applied is determined. For a ¾" hose neither of the two sizing rings is utilized. For a ⅝" hose, sizing member 74 is utilized. For a ½" hose, sizing member 78 is utilized. The apparatus is attached to the hose end by first cutting off any damaged part of the hose end. Next, the collar member 16 is slipped over the hose end, the flange end first. Next, if a sizing ring 18 is to be used, the sizing ring is slipped over the hose and moved back about six inches to a position adjacent the collar. Next, the ring sections 26 of the shank member 14 are engaged within the interior of the hose end leaving no more than the largest two ring sections uncovered. If necessary, soap may be utilized to lubricate the parts to facilitate the engagement. Next, the collar member 16 is moved axially along the exterior of the hose so that groove 78 in the outwardly facing end surface of the split ring 74 is engaged by the projecting surfaces 72 of the flange 66 of the collar 16 and the exterior periphery of the split ring is engaged by the cylindrical surface 68. Next, the interior threaded section 64 of the collar member 16 is engaged with the exterior threaded section 28 of the shank member 14. By turning the collar member with respect to the shank member through manual engagement of the gripping ridges 62 on the collar and ridges 36 on the shank member (or tool engagement with the flats of section 32 or collar flats 60), the inner section of the split ring 74 is moved into peripheral engagement with the hose, causing the interior of the hose to peripherally engage the ring sections 26. This engagement secures the hose end against pull-out and effects a water-tight seal between the shank member and the interior of the hose. It is of significance to note that the apparatus is re-usable in that by loosening the collar member 16 through a turning action in the opposite direction, the collar member can be backed off of the hose end, leaving the split ring 74 in engagement with the interior of the hose. By virtue of its split construction, either sizing member is easily removed from the embedded condition within the exterior of the hose.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. Apparatus for a re-usable attachment to garden hoses in a wide range of sizes to provide a conventional hose fitting on an end thereof, said apparatus comprising:
   (1) a tubular shank member molded of plastic material, said shank member having
      (a) an opening extending interiorly therethrough which is frustoconical at one end portion thereof,
      (b) a series of hose engaging ring sections on the exterior of said one end portion extending therefrom toward the opposed end thereof, the diameter of each ring section extending from said one end portion exceeding the diameter of the preceding ring sections,
      (c) a threaded section on the exterior of said shank member adjacent the ring section of largest diameter, said threaded section having a diameter in excess of the diameter of said adjacent ring section,
      (d) a gripping section on the exterior of said shank member spaced from said threaded section, said gripping section extending radially outwardly beyond the periphery of said threaded section, and
      (e) a fitting on the end of said shank member opposite from said one end portion thereof,
   (2) a tubular collar member molded of plastic material, said collar member having
      (a) exterior gripping surfaces,
      (b) an interior threaded section in one end portion of a size to engage the exterior threaded section on said shank member,
      (c) an interior radially inwardly directed annular flange on the other end portion having an interior diameter greater than the diameter of the largest ring section on said shank member, and
      (d) an interior generally cylindrical surface extending between said threaded section and said annular flange having a diameter size intermediate the interior diameter size of said threaded section and said annular flange, and
   (3) a plurality of annular sizing members molded of plastic material, each of said sizing members comprising a split ring having
      (a) an outer section of an exterior size to fit within said collar member in surface-to-surface engagement with the interior cylindrical surface of said collar member and an axially inwardly facing surface of the flange thereof, the exterior size of the outer section of each sizing member being the same, and
      (b) an inner section of an interior size to engage the exterior of an end portion of a hose the interior of which is engaged over a plurality of the ring sections on the exterior of said shank member, the interior size of the inner section of each sizing member being less than the interior diameter size of said flange and different from one another.

2. Apparatus as defined in claim 1 wherein said ring sections are frustoconical on configuration and converge in a direction toward said one end portion.

3. Apparatus as defined in claim 2 wherein the gripping section on the exterior of said shank member is of generally hexagonal shape.

4. Apparatus as defined in claim 3 wherein the flat surfaces defining the hexagonal shape of said gripping section are formed with a series of small ridges for facilitating manual engagement.

5. Apparatus as defined in claim 1 wherein said gripping section and said threaded section are formed with centrally located peripheral grooves.

6. Apparatus as defined in claim 1 wherein the opening in said shank member is cylindrical in the end portion thereof opposite from said one end portion and includes an annular shoulder between said cylindrical and frustoconical portions thereof which faces toward said opposite end.

7. Apparatus as defined in claim 6 wherein said fitting comprises an integral tubular male fitting portion extending from said gripping section having exterior threads thereon.

8. Apparatus as defined in claim 6 wherein said fitting comprises a female fitting collar having an interior threaded section in one end portion thereof and an interior annular flange on the other end thereof, and an annular insert member having a cylindrical portion disposed in engagement with the interior cylindrical opening portion of said shank member in abutting relation with said annular shoulder, said insert member extending outwardly beyond the opposite end of said shank member and having an exterior annular flange extending radially outwardly therefrom in axially spaced relation to the opposite end of said shank member, the interior flange of said female fitting collar being rotatably mounted between said exterior annular flange and the opposite end of said shank member.

9. Apparatus as defined in claim 1 wherein said collar member annular flange includes annularly spaced portions having axially inwardly facing hose engaging surfaces of generally barbed shape in cross-sectional configuration.

10. Apparatus as defined in claim 9 wherein each lateral face of each sizing member includes an annular groove of a cross-sectional configuration to receive the hose engaging surfaces on said collar member annular flange.

11. Apparatus as defined in claim 1 wherein the exterior gripping surfaces on said collar member include a plurality of flats at one end arranged in hexagonal configuration.

12. Apparatus as defined in claim 11 wherein the exterior gripping surfaces on said collar member further include a plurality of annularly spaced groups of axially extending ridges.

13. Apparatus as defined in claim 1 wherein the exterior gripping surfaces of said collar member include a plurality of concave surfaces at one end arranged between hexagonal flats.

14. Apparatus as defined in claim 1 wherein said plurality of annular sizing members is symmetrical with respect to the medial-radial plane to permit uni-directional assembly to hose.

15. Apparatus for a re-usable attachment to garden hoses in a wide range of sizes to provide a conventional hose fitting on an end thereof, said apparatus comprising:
(1) a tubular shank member molded of plastic material, said shank member having
   (a) an opening extending interiorly therethrough,
   (b) a series of hose engaging ring sections on the exterior of said one end portion extending therefrom toward the opposed end thereof, the diameter of each ring section extending from said one end portion exceeding the diameter of the preceding ring sections,
   (c) a threaded section on the exterior of said shank member adjacent the ring section of largest diameter, said threaded section having a diameter in excess of the diameter of said adjacent ring section,
   (d) a gripping section on the exterior of said shank member spaced from said threaded section, said gripping section extending radially outwardly beyond the periphery of said threaded section, and
   (e) a fitting on the end of said shank member opposite from said one end portion thereof,
(2) a tubular collar member molded of plastic material, said collar member having
   (a) exterior gripping surfaces,
   (b) an interior threaded section in one end portion of a size to engage the exterior threaded section on said shank member,
   (c) an interior radially inwardly directed annular flange on the other end portion having an interior diameter greater than the diameter of the largest ring section on said shank member, and
   (d) barb means extending axially inwardly from the inner surface of said annular flange, and
(3) at least one annular sizing member molded of plastic material, said sizing member comprising a ring split so as to enable the same to be expanded and compressed in diameter size, said ring having
   (a) a radially outer section of an exterior size to fit within said collar member and an interior size the same as the interior size of said annular flange,
   (b) a radially inner section radially inwardly of said outer section of an interior size less than the interior size of said annular flange,
   (c) axially inwardly facing surface means on said inner section for engaging the exterior surface of a hose end engaged over a ring section of said shank member when said collar member is moved axially inwardly of said shank member through intermeshing of the threaded sections thereof, and
   (d) groove means formed in the axially outwardly facing portion of said outer section for receiving the barb means on said annular flange and preventing both axially outward and radially inward movement of said outer section with respect to said annular flange in response to a continued axially inward movement of said collar member after engagement of said barb means within said recess means, whereby such continued movement will cause the axially inwardly facing surface means of said inner section to move into the exterior periphery of said hose.

* * * * *